Oct. 19, 1965   M. E. KURTZ   3,212,812

EXPANDABLE TOP FOR VEHICLES

Filed Aug. 29, 1963

INVENTOR.
MILLARD E. KURTZ
BY
*Flehr & Swain*
ATTORNEYS

United States Patent Office 3,212,812
Patented Oct. 19, 1965

3,212,812
EXPANDABLE TOP FOR VEHICLES
Millard E. Kurtz, 4435 24th St., San Francisco, Calif.
Filed Aug. 29, 1963, Ser. No. 305,348
2 Claims. (Cl. 296—137)

This invention relates to expandable roofs or tops and more particularly to such expandable tops for vehicles of the camper type having a rigid roof.

In the past, vehicles and vehicle attachments of the well known camper type have taken the form of relatively small containers affixed either permanently or removably to the back of light pickup trucks of the one-half ton or three-quarter ton variety. Since such vehicles are frequently used in rough country with low branches and steep grades, it is desirable to maintain the overall height of the vehicle in its running condition as low as possible. Consequently, means have been devised in the past where a relatively rigid roof of a camper-type vehicle has been pierced and wherein an expandable top has been provided. Expandable top means in the past have taken one of several different forms including fabric tent-like fixtures as well as relatively rigid expanding tops being supported by rods with fabric side walls to assist in keeping the interior of the vehicular cabin insulated from the elements.

It is, therefore, a general object of this invention to provide an improved expandable top for vehicles of the camper type.

It is a more particular object of this invention to provide a completely rigid expandable top for vehicles of the camper type.

It is another object of this invention to provide an expandable top for camper-type vehicles wherein a rigid top portion is supported by rigid side walls, all of which assist in protecting the interior of the vehicular cabin from the elements.

It is still a further object of this invention to provide an expandable top of the aforementioned character which is relatively simple in construction and is economical.

These and other objects and features of the invention will become more clearly apparent upon a review of the following description in conjunction with the accompanying drawing, in which.

Figure 1:
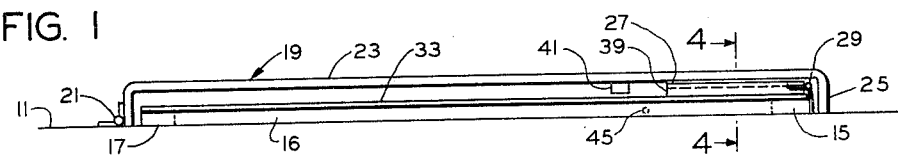
FIGURE 1 is a sectional view of an expandable top in accordance with the invention and as taken along the line 1—1 of FIGURE 2.
Figure 2:
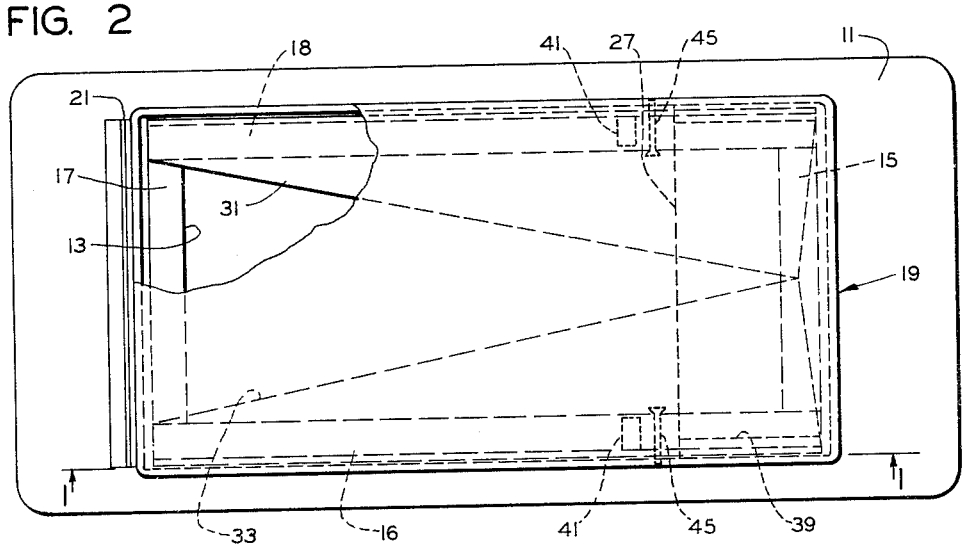
FIGURE 2 is a top plan view of an expandable top in accordance with the invention having a portion broken away to show the underside of the cover member itself.

Referring to the figures, in which like reference numerals indicate similar parts throughout, the reference numeral 11 indicates the normal rigid roof of a camper-type vehicle. The rigid roof of a vehicle is pierced by a rectangular opening 13 about which is fitted a rectangular framework including the members 15, 16, 17 and 18.

A cover member 19 is secured to the roof 11 by means of the hinge 21 at one edge of the rectangular opening 13.

As is noted from the drawing, the cover member includes a substantially flat top portion 23 and downwardly extending edge portions 25. It is noted that the cover member is of greater dimension than the rectangular opening 13 and over extends said opening as well as the frame members 15–18. The cover member 19 is swingable from its downward or closed position as shown in FIGURE 1 to its upward or open position at an acute angle with the top 11, as shown in FIGURE 3.

In order to support the cover member in its upward position there is included a first rigid support 27 which is hingedly connected to the roof adjacent that edge of the rectangular opening opposite the hinged connection of the cover member 19. The hinge 29 for the connection of the support member 27 is disposed somewhat above the actual level of the roof 11 whereby in its downward position the support 27 may overlie additional support members, as described hereinafter. As can be seen from the drawings, the support member 27 is generally rectangular in shape and in both its open and closed position is completely beneath the cover member 19.

Additional rigid supports 31 and 33 are hingedly connected to the frame members 16 and 18 adjacent the remaining edges of the roof opening 13. Thus one edge 35 of the support 33 is hinged to the frame member 16. Its opposite edge 37 defines an acute angle with the edge 35, with the vertex of the acute angle directed toward the hinge 21 for the cover member 19. Like the cover member 19 and the support 27, the supports 31 and 33 are hingedly connected between a downward closed position, as shown in FIGURE 1 and an upward open position as shown in FIGURE 3. In both their open and closed positions the supports 31 and 33 lie completely below the cover member 19.

Figure 3:
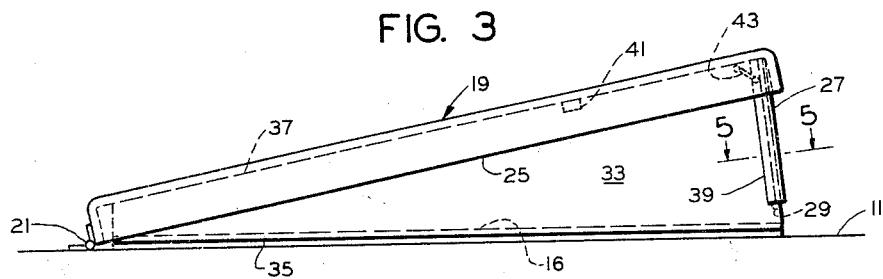
FIGURE 3 is a side elevation of an expandable top in accordance with the invention showing the top in its upper or open position.
Figure 5:
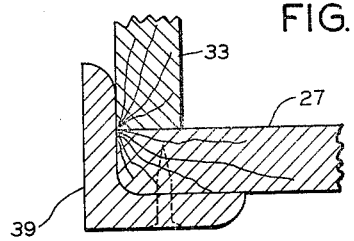
FIGURE 5 is a sectional view taken along the line 5—5 of FIGURE 3.

In the upward position of the supports and as can be seen in FIGURES 3 and 5, the support 27 extends beyond the frame members 16 and 18 and the supports 31 and 33. Thus once in their upward position, as shown in FIGURE 3, the supports 31 and 33 prevent downward movement of the support 27.

In addition, as can be seen more clearly in FIGURES 3 and 5, the support 27 includes on each end thereof an angle shield 39. The shields 39 serve not only as a backing member for the supports 31 and 33 but also to maintain a weathertight junction between the various rigid supports in their upper position.

Thus it is seen that when a cover member is in its upward position, as shown in FIGURE 3, each of the joints between the various supports and the cover member, although they are not rigidly secured together, is weatherproofed by overlapping means. The downwardly extending edge of the cover member protects the juncture of the cover member with each of the rigid supports while the angles 39 protect the juncture between the support members themselves.

In order to insure that the cover member stays in an open position, as shown in FIGURE 3, until it is desired to lower it, stop means such as the stop blocks 41 are secured to the underside of the cover member 19. As can be best seen in FIGURE 4, the stop blocks are spaced from the downwardly extending edge 25 of the cover member such that between the edge 25 and the stop 41 there is a space for receiving and retaining the rigid supports 31 and 33.

Figure 4:
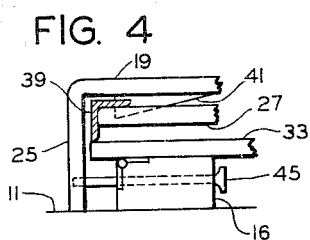
FIGURE 4 is a sectional view taken along the line 4—4 of FIGURE 1.

Also means are provided for locking the cover member both in its upper and its lower position. In the upper position, a common hook and eye arrangement 43 is provided between the cover member 19 and the rigid support 27. In the downward or closed position, as shown in FIGURES 1 and 4, the locking means may take the form of bolts 45 slidably received in the frame members 16 and 18. The downwardly extending member 25 may be drilled partially therethrough to receive the bolts 45.

In order to raise the expandable top from the position shown in FIGURE 1 to the position shown in FIGURE 3, it is merely necessary to slide the bolts 45 inward to release the cover member 19. The cover member 19 may then be raised by the head of the occupant within the vehicle and the rigid supports 31 and 33 may be spread outwardly by hand. The upward swinging of the supports 31 and 33 naturally cause the support 27 to be swung until the movement is limited to the corresponding downwardly extending edge 25 of the cover member. Here it should be noted that the downward extent of the stops 41 is less than that of the edges 25. Thus the cover member may be raised sufficiently to permit the supports 31 and 33 to pass the stops 41 while the edges 25 are still sufficiently low to prevent the supports 37, 31 and 33 to swing outwardly beyond the cover member. As the supports 31 and 33 approach their vertical position they pass under the stops 41 and the cover member is then lowered until it rests on each of the various support members 27, 31 and 33. The expandable top may be locked in this position by employing hook and eye means 43. Conversely, in order to lower the top it is merely necessary to unlock the hook and eye 43, raise the top of the cover member 19 slightly to permit the rigid supports 31 and 33 to be lowered beyond the stops 41.

Thus it is seen that an improved expandable top for vehicles of the camper type is provided. The top has rigid side walls which not only serve adequately to support the cover member itself but also to completely weather protect the interior of the cabin upon which the top is mounted.

I claim:

1. In a vehicle of the type having a rigid roof pierced with a rectangular opening, an expandable top comprising a cover member hingedly secured to said roof at a first edge of said rectangular opening, a first rigid support hingedly secured to said roof at a second edge of said rectangular opening, said second edge being opposite said first edge, second and third rigid supports hingedly secured to said roof at the remaining edges of said rectangular opening, said second and third supports being narrower on that side adjacent said first edge of the opening than on that side adjacent the second edge, whereby upon swinging the cover member and each of the rigid supports upward from the roof, each of the rigid supports lies along the underside of said cover member, said cover member extending beyond the lines of hinged connection of the rigid support members and including downwardly extending edge portions whereby said rigid supports in their upward position lie adjacent and inside said downwardly extending edge portions to provide a weathertight connection, and stop means on the underside of said cover member, said stop means spaced from the downwardly extending edges of the cover member corresponding to said remaining edges of the opening whereby said second and third rigid supports in their upward position are retained between said stop means and said downwardly extending edges of said cover member.

2. In a vehicle of the type having a rigid roof pierced with a rectangular opening, an expandable top comprising a rectangularly shaped cover member, said cover member including a substantially flat top portion and downwardly extending edge portions, said top portion being greater in dimension than said rectangular opening, said cover member being hingedly connected to said roof adjacent a first edge of said rectangular opening whereby the cover member is swingable between a downward closed position and an upward open position forming an acute angle with said rigid top, a first rigid support hingedly connected to said roof adjacent a second edge of said rectangular opening, said second edge being opposite said first edge, said first rigid support being rectangular in shape and swingable between a downward closed position and an upward open position and lying completely below said cover member, second and third rigid supports hingedly connected adjacent the third and fourth edges of said rectangular opening, the edge of each of said second and third supports opposite that edge hingedly connected to the roof defining an acute angle with the line of hinged connection thereof, the vertex of said acute angle being directed toward said first edge of said rectangular opening, said second and third supports being swingable between a downward closed position and an upward open position and lying completely below said cover member, the upper edge of all of said rigid supports in their open position lying adjacent the interior of said downwardly extending edge portion of the cover member, and stop means secured to the underside of said top member and spaced from the downwardly extending edge portion thereof, whereby at least one of said rigid supports in its upward position is received between said stop member and said downwardly extending portion.

References Cited by the Examiner

UNITED STATES PATENTS

| | | | |
|---|---|---|---|
| 1,998,937 | 4/35 | McGinnis | 296—23 |
| 2,119,154 | 5/38 | Downing | 296—23 |
| 2,920,919 | 1/60 | Spencer | 296—23 |
| 2,926,042 | 2/60 | Calthorpe. | |
| 2,934,388 | 4/60 | Brown | 312—334 |
| 3,061,359 | 10/62 | Pearlman | 296—137 X |

FOREIGN PATENTS 29,115    7/31    Australia.

A. HARRY LEVY, *Primary Examiner.*